United States Patent [19]

Buckley

[11] Patent Number: 5,106,403
[45] Date of Patent: Apr. 21, 1992

[54] ORGANIC LENS MOULD METHOD WITH PROCESS FOR MAKING A COUNTERSINK

[75] Inventor: Milford L. Buckley, Horseheads, N.Y.

[73] Assignee: Corning Incorporated, Corning, N.Y.

[21] Appl. No.: 673,340

[22] Filed: Mar. 22, 1991

[51] Int. Cl.$^5$ ............ C03C 19/00; B29D 11/00
[52] U.S. Cl. ............ 65/55; 165/54; 165/61; 165/36; 165/37; 425/808; 51/283.1; 264/219; 264/2.5
[58] Field of Search ............ 65/361, 37, 38, 39, 65/61, 32.2, 42, 54, 55, 23; 264/219, 1.7, 1.8, 2.5; 425/808; 51/281 R, 283 R, 284 R

[56] References Cited

U.S. PATENT DOCUMENTS

| | | | |
|---|---|---|---|
| 901,579 | 10/1908 | Wilhelm | 65/39 |
| 1,886,649 | 11/1961 | Culver | 65/61 |
| 2,057,179 | 10/1936 | Bausch | 65/61 |
| 2,885,829 | 5/1959 | Emerson | 65/138 |
| 3,130,029 | 4/1964 | Cala | 65/61 |
| 4,163,655 | 8/1979 | Campbell | 65/61 |
| 4,906,422 | 3/1990 | Buckley | 65/37 |

*Primary Examiner*—Kenneth M. Schor
*Assistant Examiner*—John Hoffmann
*Attorney, Agent, or Firm*—Milton M. Peterson; Clinton S. Janes, Jr.

[57] ABSTRACT

A method of producing a blank for the primary member of a glass mould in which an organic polymer, multifocal, ophthalmic lens is cast. A glass major element is formed that has a raised countersink zone on one surface, the remainder of the glass major element being thinner than the countersink zone, but of such thickness that it can form the far vision surface of a mould. A countersink is formed in the countersink zone and a segment element is formed and fused in the countersink. This forms a lens mould assembly which, when ground and polished to the predetermined far vision curvature and countersink size, produces a mould in which an organic lens may be cast.

6 Claims, 3 Drawing Sheets

ORGANIC LENS MOULD METHOD WITH PROCESS FOR MAKING A COUNTERSINK

FIELD OF THE INVENTION

The field is moulds for casting organic polymer, multifocal, ophthalmic lenses, and, more particularly, a method of producing the primary glass member for such mould.

BACKGROUND OF THE INVENTION

Glass, multifocal lenses are conventionally produced by forming a countersink in a glass major element, fusing a segment element in the countersink, and finishing the fused blank to a desired surface curvature. It is not practical to produce an organic polymer, multifocal lens in this manner. Rather, such a lens is moulded in a one-piece construction from a single material.

Currently, organic lenses are produced by filling a cavity with a liquid monomer containing known polymerizing additives. The cavity may be formed by an assembly of two glass mould members held in spaced relationship by a flexible gasket. The inside surface contours of the two mould members are precisely the reverse of the surface contours desired on the organic lens, after shrinking of the polymer during the curing cycle.

In a mould for an organic, multifocal lens, one mould member may have a smooth, continuous, inside surface, as in a monofocal lens mould. The other mould member, here referred to as the primary mould member, must have its inside surface contoured to provide the required corrective curvatures. In a bifocal lens, there are two contours which provide the near and far vision corrections. Necessarily the corrective curvatures have different radii of curvature. Hence, they are separated at their juncture by a narrow wall extending between an edge on one surface of corrective curvature and the second surface of corrective curvature. As a result, the prescription power and surface finish quality of an organic, multifocal lens depends entirely on the finished accuracy of the glass mould members against which the lens is formed.

The conventional method of producing the primary member for an organic, multifocal lens mould is essentially a reversal of conventional, glass, multifocal lens practice. Thus, a major element is formed from a type of glass commonly known as a crown glass. This major element has a cavity, commonly referred to as a countersink, ground and polished in its concave or inside surface. The cavity is normally concave with differing curvatures as the corrective add focal length requires. The major element provides the convex curve for the far vision, or distance, correction in the final cast organic lens.

A second element, known as a segment, is formed separately for mounting in the concave cavity in the major element. In the cast organic lens, the curvature imparted by the segment portion of the mould provides near vision, or reading, correction. The segment may be of the same glass as the major element, or, more commonly, is a soft crown glass of compatible fusing properties, except 15° C. to 25° C. softer than the major element.

One surface of the segment is ground and polished to a curvature that is the reverse, usually convex, of the countersink curvature. The segment is then mounted in the countersink with its finished surface facing the polished countersink surface of the major. Normally, it is mounted in a predetermined location above the center of the countersink. In assembling the segment in the cavity of the major element, the lower edge rests against the cavity and the upper edge rests on spacers.

The assembly is then heated to fusion temperature to unite the segment with the major element in the countersink cavity. This fused combination is ground and polished to a predetermined far vision, or distance, curve correction and reading segment cavity size. This provides a mould member having the desired curve corrections for casting the front finished surface of an organic polymer, multifocal, ophthalmic lens.

My earlier patent, U.S. Pat. No. 4,906,422, is concerned with constructing the contoured surface on a primary mould member for a glass mould. It describes the foregoing procedure in greater detail, and, therefore, is incorporated, in its entirety, by reference. The patent is primarily concerned with a method wherein a glass segment is produced by pressing a glass body with a cavity. The glass web is removed to provide a perforated segment blank. The perforated segment blank is assembled in a concave countersink on a major element. The assembly is then fused and finished to provide a primary member for an organic, multifocal mould.

Another patent, my U.S. Pat. No. 4,992,086 describes a modified method of moulding the major element for a glass, multifocal lens blank. In particular, that application describes forming a major element that has a raised countersink zone on one surface. The remainder of the glass major element is thinner than the countersink zone, but of such thickness that it can be ground and polished to form a lens. A countersink is formed in the countersink zone and a segment element is fused in the countersink to form a lens blank assembly. The disclosure of this patent is also incorporated in its entirety by reference.

PURPOSES OF THE INVENTION

In conventional practice, a substantial portion of a fused, multifocal mould has to be ground away to produce the final casting geometry required. This represents a double economic loss. There is, of course, initial glass cost. Then, the grinding process consumes both time and significant material, in glass and grinding tools, to finish the front, concave moulding surface to the desired segment add size.

It is, then, a basic purpose of the present invention to provide a less expensive method of producing a primary member for a fused, multifocal, glass mould for casting organic lenses.

Another purpose is to provide a method of producing a fused, multifocal, glass mould for organic, ophthalmic lenses in which a much smaller amount of glass must be removed from the glass, moulded blank, particularly from the major element.

A further purpose is to conserve material and finishing time in the production of a primary, glass mould member for an organic, multifocal lens mould.

A still further purpose is to modify the lens blank technique disclosed in my '086 patent, and utilize that modified technique in producing the primary, glass mould member for an organic, multifocal lens mould.

SUMMARY OF THE INVENTION

In fulfillment of these and other apparent purposes, my invention resides in an improved method of producing a blank for the primary member of a glass mould in which an organic polymer, multifocal, ophthalmic lens is cast which comprises forming a glass major element, the glass major element having a raised countersink zone on one surface, the remainder of the glass major element being thinner than the countersink zone, but of such thickness that it can be ground and polished to provide a surface of curvature, largely removing the raised portion of the major to form a countersink that extends below the line of finished lens curvature defined by the upper surface of the remainder of the major element, forming a segment element, placing the segment element in the countersink on the glass major element and subjecting the assembly to a fusing temperature to provide a fused blank adapted to have a predetermined surface of curvature imparted by grinding and polishing. In a preferred embodiment, a raised shoulder is retained when the countersink is formed, thus accommodating confinement of the segment during sealing, and strengthening the edge of the countersink. Subsequent to fusion sealing, the mould segment is preferably formed by the technique described in my earlier glass lens patent ('422).

PRIOR ART

In addition to my patents earlier mentioned, the following patent literature is of possible interest:

My U.S. Pat. No. 4,842,632 describes in detail the conventional practice followed in producing glass, multifocal lens blanks and lenses.

U.S. Pat. No. 901,576 (Wilhelm) discloses forming a molded glass blank having integral projections which surround a cavity. These projections support a disk to be thermally sagged into the cavity and united with the blank.

U.S. Pat. Nos. 1,157,411 (Morine) and 1,282,877 (Laabs) disclose sealing positioning means on a major blank to maintain a segment in proper location during fusion.

U.S. Pat. No. 2,936,674 (Beasley) shows sealing button segments (identified by numerals 12 and 15) on the surface of an optical blank. After finishing, one of the button segments is removed to provide two surfaces of curvature with a vertical wall at their boundary.

Canadian Patent No. 681,166 (Poundstone) discloses a method of forming a minor segment assembly. Once formed, the assembly is placed in a countersink of a standard glass major and fusion sealed in a conventional manner.

U.S. Pat. Nos. 3,649,236 (Rosenbauer) and 4,163,541 (Campbell) disclose methods of producing moulds for casting organic, multifocal lenses wherein a perforated glass blank may be used in producing desired corrective curvatures on a primary mould member.

None of these patents has any suggestion of producing a primary glass member for an organic, multifocal mould by forming a thin major element having a raised countersink zone on one surface, a key feature of the present invention.

DESCRIPTION OF THE INVENTION

The present invention essentially modifies conventional, multifocal, fused mould making practice. The modification minimizes the amount of glass material that must be removed in converting a fused mold assembly into a finished mould for casting polymer lenses.

Figure 1:
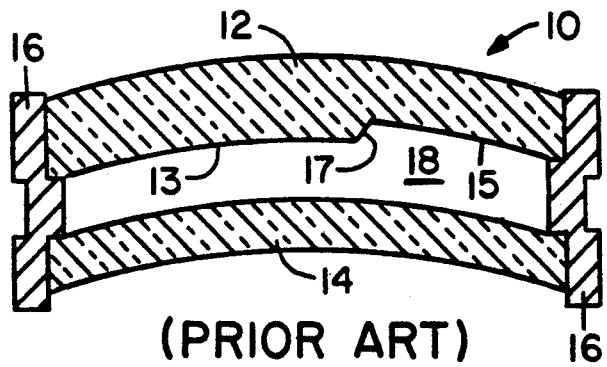
FIG. 1 is a cross-section view of a mould heretofore used in producing organic polymer, bifocal lenses.

FIG. 1 illustrates the current technique used in casting organic polymer lenses. Mould assembly 10 comprises two glass mould members 12 and 14 shown maintained in spaced relationship by a flexible gasket member 16 surrounding the spaced glass members. This provides a cavity 18 into which a liquid monomer mixture may be cast to cure. Primary mould member 12 is a fused glass body having a contoured inner surface. Mould member 14 has a convex, spherical, inner surface of curvature that is continuous.

Mould member 12 is adapted to mould a reverse contoured surface on an organic polymer, bifocal lens moulded in mould assembly 10. The contoured surface of primary mould member 12 consists of two surfaces of curvature 13 and 15, each having a different radius of curvature. The inner edge of surface 13 is spaced from surface 15 by a narrow wall 17, which is at an angle of 10°-15° to a plane normal to surface 15. This slanted wall has traditionally been provided to permit opening of assembly 10 for removal of a moulded organic lens without damage to the lens.

Figure 2:
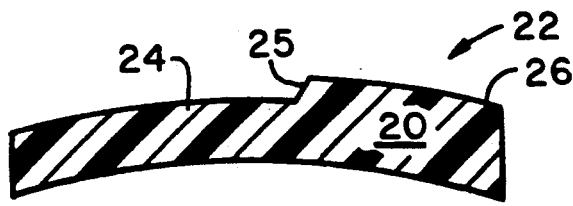
FIG. 2 is a cross-section view of an organic polymer, bifocal lens cast in the mould of FIG. 1.

FIG. 2 shows an organic polymer, bifocal lens 20 as produced in assembly 10. The upper surface 22 is made up of a major, or far vision, curvature 24 and a segment, or reading, curvature 26. These surfaces of curvature are imparted by, and hence are the reverse of, surfaces of curvature 13 and 15 formed on the inner face of glass mould member 12. Consequently, surfaces of curvature 24 and 26 have different radii, and are spaced by a slanted wall 25, as in primary mould member 12.

Figure 3:
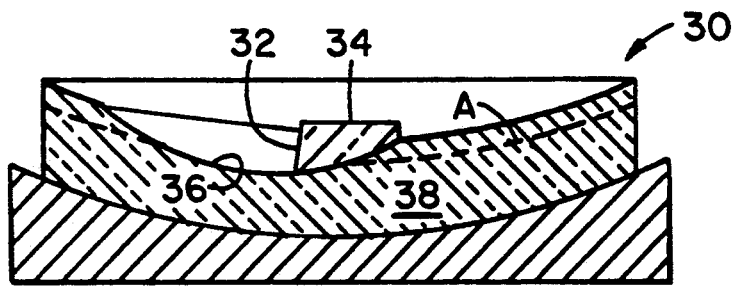
FIG. 3 is a cross-section view of one form of assembly that may be used in producing the primary, glass mould member of FIG. 1.

FIG. 3 shows a typical assembly 30 in the production of a fused glass, primary mould member, such as shown at 12 in FIG. 1. Initially, an element, in the nature of a segment or button, is moulded. Then, one flat edge of such element is ground away at an angle of 10°-15°, as shown at 32, to permit ultimate release of a cast organic lens. This produces segment element 34 which is mounted for fusion in a depression 36 formed in glass major element 38. The assembly is now subjected to a heat treatment to fuse segment 34 to major element 38.

It may be noted that the finished surfaces on depression 36 and wall 32 are in the desired final condition at this point. Therefore, this procedure requires that great care be taken to protect those surfaces during further operations.

The fused assembly is then top-side ground and polished to remove sufficient glass to provide a contoured surface that is the precise reverse of that desired on the organic lens to be cast thereagainst.

Figure 4:
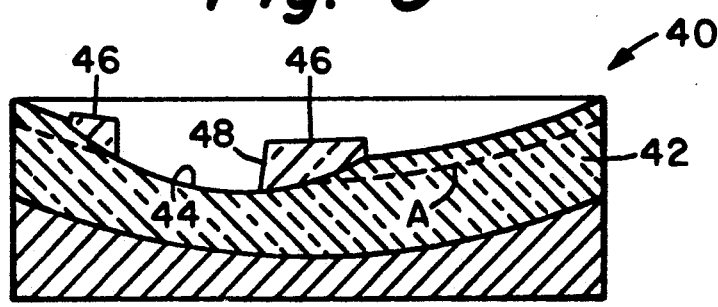
FIG. 4 is a cross-section view of an alternative form of assembly that may be used in producing the primary, glass mould member of FIG. 1.

FIG. 4 shows a mould blank assembly 40, in accordance with the invention in my '422 patent, preparatory for fusion heat treatment. Major element 42 has depression 44 formed in its upper surface. A perforated body 46 is placed in depression 44 with suitable support pins in accordance with standard glass, bifocal lens fusion practice. Body 46 is so located in depression 44 that it is displaced from the center line of major 42, and has its slanted wall portion 48 oriented inwardly toward the center line.

Following fusion at 710°-725° C., preferably 710°-715° C., blank 40 is cooled and the cavity in body 46 is filled with a protective filler. This prepares the blank for top-side grinding to the desired major curve for the distance power curve for a major element, as indicated by a dotted line A in FIG. 4. Thereafter, the filler is removed to provide a glass mould member, as shown at 12 in FIG. 1.

It will be appreciated that a narrow portion of slanted wall portion 48 remains. This forms a spacing or separating wall 17 between surfaces of curvature 13 and 15 on the contoured surface of mould member 12, as shown in FIG. 1. The criticality of properly orienting perforated body 46 in depression 44 is apparent. This insures formation of wall 17 with the required slant to facilitate opening of mould 10 after casting a lens such as lens 20 of FIG. 2.

Figure 5:
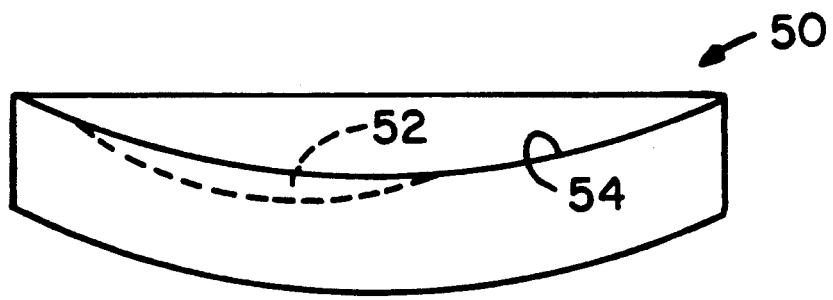
FIG. 5 is a cross-section view of a glass major element, such as used in the prior art illustrated in FIGS. 3 and 4.

FIG. 5 shows, in a cross-section view, a glass major blank 50 such as used in prior art assemblies, for example, those shown in FIGS. 3 and 4. A countersink 52, as shown by dotted lines, would be ground and polished in the concave surface 54. A separately formed segment, such as 34 in FIG. 3, would then be fused in the countersink. Subsequently, the entire blank must be ground and polished to produce the desired dual curvature as shown by surfaces 13 and 15.

Figure 6:
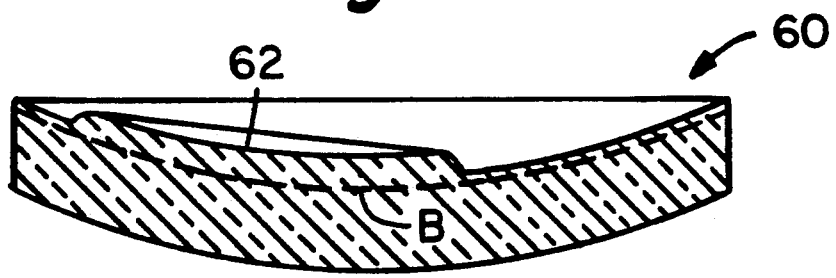
FIG. 6 is a cross-section view of a moulded major element in accordance with the present invention.
Figure 7:
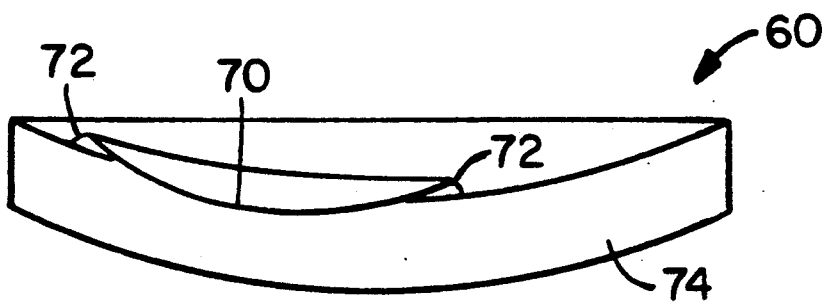
FIG. 7 is a cross-section view of the major element of FIG. 6 after a countersink is formed therein.

A key feature of the present invention is utilization of a moulded, major mould element blank 60 of unique shape. This unique major blank, as shown in FIG. 6, is much thinner than normal, except for a raised portion here referred to as countersink zone 62. Countersink zone 62 is that portion of the major which is largely removed by grinding and polishing to form a countersink, as shown by numeral 70 in FIG. 7.

In forming countersink 70, a raised shoulder or bead 72 of suitable diametrical size is retained around the periphery of the countersink. This can be smaller than required by the prior art. This accommodates confinement of the seal during fusion of an oversize segment or a round cavity segment. In accordance with conventional, multifocal mould fusing practice, these segments are necessarily oversize, that is, larger than the final, finished, reading segment countersink cavity.

Peripheral shoulder or bead 72 also serves to strengthen the periphery of the countersink. This enables it to accommodate mechanical grinding and polishing by conventional mass production techniques to set a smooth blend of surfaces without chippage or marring of the polished surface when forming a countersink.

The remainder of major element 60, identified by numeral 74, is of such thickness that countersink 70 can be formed, and the upper surface can be ground and polished, in forming a final mould. Normally, the overall thickness of blank 60 in countersink zone 62 approximates the normal, uniform thickness of prior, moulded, major mold element blanks. The remaining portion 74 will be substantially thinner, but, preferably, three to five times the peripheral shoulder thickness of zone 62.

Figure 8:
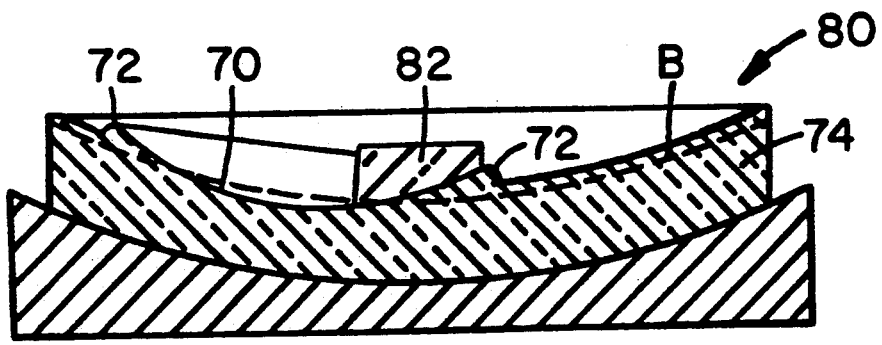
FIG. 8 is a cross-section view of a primary mould member blank assembly in accordance with the invention.

FIG. 8 shows a mould blank assembly 80 in accordance with the invention. In assembly 80, segment member 82 is essentially identical to prior segment 34 of FIG. 3. Segment 82 is mounted in countersink 70 preparatory to fusion. Segment 82, like segment 34, can be the same glass as the major element 74, or a 20°-30° C. softer composition that is compatible with the crown glass of major 74.

It will be appreciated that the present invention employs conventional glasses for both the major and the segment member. These glasses will, of course, be selected in conventional manner to provide fusing and finishing compatibility for the ultimate lens mould. Neither the glasses chosen, nor the combinations employed, are part of the present invention. Further details are considered unnecessary, since the glasses are well known and widely used in the art. However, the invention is of particular interest in connection with the increased size of moulds required by today's demand, and the greater difficulty and cost of producing such moulds.

Figure 9:
FIG. 9 is a cross-section view of the assembly of FIG. 8 after being finished as a primary mould member.

When the assembly 80 of FIG. 8 is fused in the conventional fusing step, the resulting mould assembly is ready for finishing. This is done by grinding and polishing to remove the bulk of segment 82, plus a thin layer from the upper surface of major 74. The finish line is shown by dotted line B in FIG. 8. The finished primary mould member 90, thus produced, is shown in FIG. 9.

Figure 10:
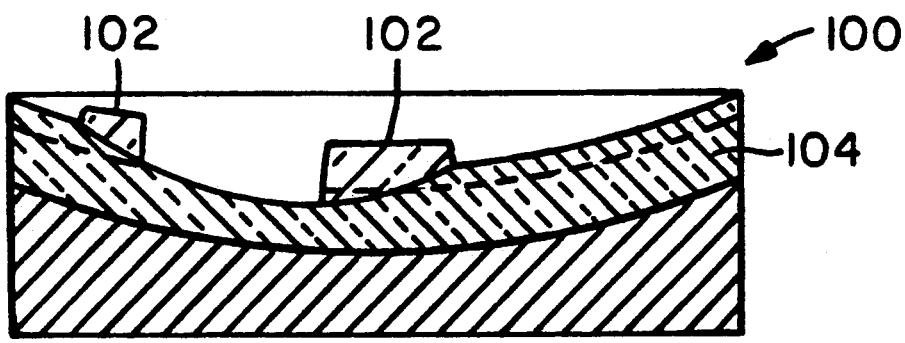
FIG. 10 is a cross-section view of an alternative assembly for producing a primary mould member in accordance with the invention.

FIG. 10 illustrates the assembly 100 used in producing a primary mould element utilizing a perforated segment 102. It may be noted that assembly 100 corresponds to that of FIG. 4, except for glass major element 42, which is substantially thicker then glass major element 104 of assembly 100. Fusion and finishing of assembly 100 will correspond to that described for assembly 80.

Dotted lines in FIGS. 3,4,6,8 and 10 represent the final finish line in the resulting mold in each case.

It is readily apparent, particularly from a comparison of FIGS. 1-5 with FIGS. 6-10, that the present invention provides a substantial saving in glass lost by grinding and polishing, as well as time and cost involved in the grinding and polishing steps.

I claim:

1. In a method of producing a glass mold in which an organic polymer, multifocal, ophthalmic lens is cast, the mold having a primary member, which method comprises forming a glass major element having a curved upper surface, the improvement comprising forming a raised portion in one area of the curved upper surface, said portion being protrubably raised with respect to the curvature of the curved upper surface, with the remainder of the glass major element being unraised and of such thickness that it can be ground and polished to provide a surface of curvature, removing a large part of only the raised portion of the major element to form a countersink that extends below the upper surface of the unraised portion of the major element, such that the radius of curvature of the countersink is different from that of the upper surface of said major element, forming a glass segment element, assembling the segment element in the countersink on the glass major element and then subjecting the resulting assembly to a fusing temperature to provide a fused assembly of said segment element and said major element that is thereafter ground and polished to a predetermined surface of curvature.

2. A method in accordance with claim 1 wherein the glass major element is formed from a white crown glass.

3. A method in accordance with claim 1 wherein, in removing the large part of the raised portion of the glass major element to form a countersink, a raised shoulder is retained around the periphery of the countersink to accommodate confinement of the segment element and strengthen the edge of the countersink.

4. A method in accordance with claim 3 wherein the thickness of the unraised portion of the glass major element is three to five times the thickness of the raised peripheral shoulder of the countersink.

5. A method in accordance with claim 1 wherein the segment element has a wall portion slanting at an angle of 10°–15° to a vertical plane through the major element.

6. A method in accordance with claim 1 wherein the segment element is perforated.

* * * * *